US006912973B2

(12) United States Patent
Murray et al.

(10) Patent No.: US 6,912,973 B2
(45) Date of Patent: Jul. 5, 2005

(54) AUTOMATIC CAGE LOCK

(75) Inventors: Dale Murray, Elkton, MD (US); William Marston, Conowingo, MD (US); Rodney Gerringer, Bel Air, MD (US); Lynn Irwin, Seaford, DE (US)

(73) Assignee: Lab Products, Inc., Seaford, DE (US)

( * ) Notice: Subject to any disclaimer, the term of this patent is extended or adjusted under 35 U.S.C. 154(b) by 0 days.

(21) Appl. No.: 10/274,680

(22) Filed: Oct. 21, 2002

(65) Prior Publication Data

US 2003/0131802 A1 Jul. 17, 2003

Related U.S. Application Data

(60) Provisional application No. 60/348,846, filed on Oct. 19, 2001.

(51) Int. Cl.[7] ................................................ A01K 1/03
(52) U.S. Cl. ..................................................... 119/455
(58) Field of Search ................................. 119/455, 453, 119/457, 481, 417, 418, 419

(56) References Cited

U.S. PATENT DOCUMENTS

| | | | | |
|---|---|---|---|---|
| 3,662,713 A | * | 5/1972 | Sachs | 119/457 |
| 4,365,590 A | * | 12/1982 | Ruggieri et al. | 119/418 |
| 4,402,280 A | * | 9/1983 | Thomas | 119/418 |
| 4,754,624 A | * | 7/1988 | Fleming et al. | 70/95 |
| 5,802,892 A | * | 9/1998 | Cohn et al. | 70/84 |
| 5,954,013 A | * | 9/1999 | Gabriel et al. | 119/419 |
| 6,584,936 B2 | * | 7/2003 | Rivard | 119/419 |

FOREIGN PATENT DOCUMENTS

GB      2332701 A    *   6/1999          A01K/1/03

* cited by examiner

Primary Examiner—Son T. Nguyen
(74) Attorney, Agent, or Firm—Stroock & Stroock & Lavan LLP (57) ABSTRACT

An automatic cage lock for securing various cages in a ventilated cage and rack system. The automatic cage lock facilitates the securing of a cage within the cage and rack system when a user slides the cage into the cage and rack system until the cage fully passes the locking finger component of the automatic cage lock. The cage may be easily unlocked by applying a small amount of pressure to the locking finger while simultaneously grasping the cage for removal. A color-coded indicator block may be disposed on the end of the lock assembly; the indicator block may be hidden by an indicator shield when the cage is securely docked in the rack. Conversely, the indicator block may be visually exposed when a cage is present in the rack but not fully docked within the rack. The indicator block provides a clear indication to a user as to the docking status of the cage.

38 Claims, 8 Drawing Sheets

AUTOMATIC CAGE LOCK

CROSS-REFERENCE TO RELATED APPLICATIONS

This application claims the benefit of U.S. Provisional Application Ser. No. 60/348,846, entitled Automatic Cage Lock, filed on Oct. 19, 2001, the contents of which are incorporated herein by reference.

BACKGROUND OF THE INVENTION

1. Field of the Invention

This invention relates to an improved cage lock for securing a laboratory animal cage in a cage and rack system and, in particular, to a cage lock which releasably secures cages within a cage and rack system.

2. Description of Related Art

Cage and rack systems used to store laboratory animals are well known in the art. Typically, such systems include a plurality of shelves, each shelf containing a plurality of cages which provide air and/or water to the animals stored therein. The cages are generally removable from the rack to provide access to the laboratory animals for feeding and testing, and to provide access to the cages for cleaning, maintenance and transport. To accommodate these requirements, rack systems are typically designed so that the cages can slide in and out of the rack system. When a laboratory animal is housed and maintained in the cage, the cage may be secured in place in the rack with a cage lock to prevent the cage from inadvertently sliding out from the rack. One concern of not securing a cage in the rack is that a sliding cage can cause suffocation of the laboratory animal within the cage by a disruption in air supply, dehydration of the laboratory animal by a disruption of water to the cage drinking valve or injury or death to an animal from the impact of the cage falling from the rack. One such system is disclosed in U.S. Pat. No. 5,954,015, the contents of which is incorporated herein be reference.

While related cage locks work for their intended purposes, a deficiency of related cage locks is that the lock has to be grasped in order to switch it between the locked and unlocked positions when inserting a cage. Another deficiency of related locks is that changing the position of the lock to accommodate a different cage size is cumbersome because it requires an operator to pull a retaining member away from a base member while at the same time rotating the retaining member 180 degrees. These cage locks typically require a user to make use of the back of his or her hand to disengage the cage lock. Yet another deficiency with known locks is that it can be difficult to determine whether the locking mechanism is in the locked or unlocked position without carefully observing the state of the locking mechanism. Additionally, related cage locks are typically relatively large, thus obstructing a user's view to the cage interior. Related cage locks also typically contain a relatively large amount of components, such as springs, hinges and fasteners. This relative mechanical complexity leads to corresponding manufacturing and maintenance costs. Further more, related cage locks, due to the nature of their mechanical design, typically facilitate the marring of cage side walls. As such, a need exists for an improved cage locking mechanism and system.

SUMMARY OF THE INVENTION

The present invention satisfies this need. The present invention is directed to a cage lock for securing cages in a ventilated cage and rack system that facilitates locking and unlocking of the cage.

The present invention is directed to an automatic cage lock that secures an animal cage within a cage and rack system with minimal effort by, or inconvenience to, its user by providing hands free locking while installing the cage into the cage and rack system while also providing easy removal of the cage with the slight use of a single finger while simultaneously grasping the cage with both hands.

The automatic cage lock may comprise a flexing lock member for securing the cage in the cage and rack system having a member deflector to automatically deflect the flexing lock member away from the cage during insertion of the cage into the cage and rack system. Once the cage is fully inserted into the rack, the flexing lock member resiliently returns to the locked position. This flexing away during insertion of the cage and return to the locking position once the cage is fully inserted may relieve the user of the need for awkward hand maneuvers during insertion and locking of the cage. Furthermore, the use of a flexing lock member may eliminate the need for any relatively complex mechanical structures such as hinges, springs or fasteners.

An embodiment of the invention may provide for a visual indicator so that a user can easily visually determine whether or not a particular cage is in a locked condition.

An embodiment of the invention may comprise a mounting bracket comprised of a base and a support arm. The support arm may include a docking channel which allows a lock assembly to be slidably mounted to the support arm. The support arm may be configured to be mated to the lock assembly to reduce sliding between the support arm and the lock assembly. A fastening member may be disposed through the support arm to securely lock the support arm and the lock assembly together subsequent to adjusting the length of the automatic cage lock.

Other objects and features of the present invention will become apparent from the following detailed description, considered in conjunction with the accompanying drawing figures. It is to be understood, however, that the drawings are designed solely for the purpose of illustration and not as a definition of the limits of the invention.

BRIEF DESCRIPTION OF THE DRAWINGS

In the drawing figures, which are merely illustrative, and wherein like reference numerals depict like elements throughout the several views.

DETAILED DESCRIPTION OF EXEMPLARY EMBODIMENTS

The present invention is directed to an automatic cage lock that secures an animal cage within a cage and rack system with minimal effort by, or inconvenience to, its user by providing hands free locking while installing the cage into the cage and rack system while also providing easy removal of the cage with the use of, for example, a slight left movement of the thumb on a user's left hand to disengage the lock while simultaneously grasping the cage with both hands. Additionally, a visual indication of whether the cage is in the locked position is also provided.

Figure 1:
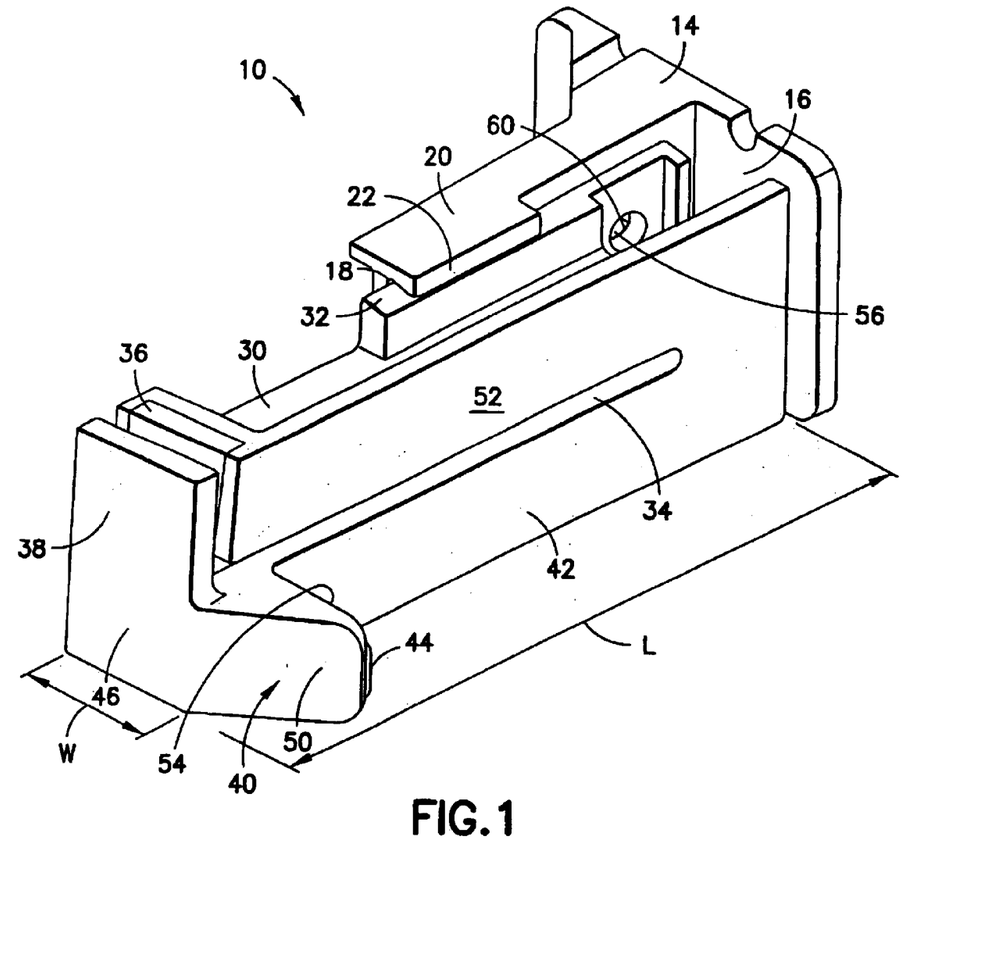
FIG. 1 is a perspective view of an automatic cage lock constructed in accordance with the present invention.

Referring now to the drawings in detail, FIG. 1 depicts an embodiment of an automatic cage lock 10 constructed in accordance with the present invention. The automatic cage lock 10 is comprised of a mounting bracket 14 and a lock assembly 30. In an exemplary embodiment, the automatic cage lock 10 is molded of an autoclaveable material, however, the automatic cage lock 10 may also be manufactured in stainless steel or by an application of material design well known to one skilled in the art. The mounting bracket 14 is comprised of a base 16 and a support arm 20 which may be unitarily formed. The support arm 20 extends generally outwardly and away from the base 16 and is generally perpendicular thereto. The base 16 of the mounting bracket 14 is generally flat which allows the mounting bracket 14 to be mounted to a variety of surfaces. The support arm 20 of mounting bracket 14 has at least one docking tab 22 which is formed in parallel with support arm 20. Docking tab 22 has a generally angular surface which forms a docking channel 18 therein. The docking channel 18 allows the lock assembly 30 to be slidably mounted to the support arm 20. The slideable mounting feature of automatic cage lock 10 allows the adjustment of the lock assembly 30 within the mounting bracket 14 to adjust the longitudinal length of the automatic cage lock 10 to fit various sized cages and configurations.

The lock assembly 30 includes at least one mounting rail 32. The mounting rail is generally angular shaped to provide slideable mounting to support arm 20. The lock assembly has a locking aperture 56 formed therein. The locking aperture 56 may be generally circular (although other shapes may be used as a matter of application specific design choice by one skilled in the art) and provides a means for fixably securing the lock assembly 30 to the mounting bracket 14. A plurality of engagement teeth 60 may be formed adjacent to locking aperture 56 to provide a secure mating between lock assembly 30 and mounting bracket 14 and to prevent sliding therebetween. A flexing lock member 42 and a visual indicator arm 52 may be unitarily formed in a generally U-shaped configuration. The U-shaped configuration of flexing lock member 42 and visual indicator arm 52 forms a separation channel 34 therebetween. The separation channel 34 allows flexing lock member 42 to move independently of visual indicator arm 52.

A locking finger 50 is disposed at the end of the flexing lock member 42. The locking finger 50 has a locking plate 54 and a locking tab 44 formed thereon. The locking plate 54 is generally flat and is disposed on the locking finger in a configuration that is generally perpendicular to flexing lock member 42. The locking plate 54, due to its shape, which in an embodiment of the invention is flat and plate-like, prevents the cage from falling out of the cage and rack system after the cage is securely docked therein. The locking tab 44, which protrudes from the end of the locking finger 50, provides a secure means of securing the cage within the cage and rack system by engaging about the edge of the cage whereby preventing the locking finger 50 from becoming disengaged. The locking finger 50 has a member deflector 40 formed thereon which is generally flat and angular. The member deflector 40, due to its shape, facilitates deflection of the flexing lock member 42 and the locking finger 50 out of the path of the cage as it is being inserted into the cage and rack system. The smooth angular shape of member deflector 40 also serves to minimize scratching from occurring to the side of the cage.

In an embodiment of the invention, portions of one, all, or some combination of member deflector 40, end block 46 and locking tab 44 may be formed of a lightweight, durable low wear, low friction plastic such as, for example, the material sold by E.I. Du Pont De Nemours and Co. under the trade name DELRIN®. Use of such a material in accordance with the invention tends to minimize squeaking sounds when a cage rubs against either deflector 40, end block 46 or locking tab 44.

After the cage is fully inserted into the cage and rack system, the flexing lock member 42 springs back into its original position to securely lock the cage into place.

The visual indicator arm 52 may have an indicator block 36 inserted therein. The indicator block 36 may be color-coded (e.g., yellow) and is used to visually indicate whether a cage is securely docked in the cage and rack system or is at risk of falling out. The color-coded indicator block 36 provides a quick visual check which the user may conveniently employ to see whether the cage is securely docked in the cage and rack system. A securely docked cage is profoundly important to the health and well-being of the animal or animals contained therein. For example, a cage that is not properly docked may lack the proper ventilation or access to a water supply that is required for the survival of the animal. Typically, cage and rack systems have ventilation systems and water supply systems that are only accessible to the rear of the cage when it is fully docked in the cage and rack system. Therefore, an improperly docked cage could compromise the animal contained therein.

The flexing lock member 42 containing the locking finger 50 has an end block 46, that may be unitarily formed with an indicator shield 38. The end block 46 and the indicator shield 38 may be unitarily formed and adjacent to the locking finger 50. The end block 46 and indicator shield 38 are disposed generally parallel to the locking plate 54 and protrude outwardly from the locking finger 50 so as to cover the indicator block 36 when the flexing lock member 42 is in its original, or locked position. As the cage is being inserted into the cage and rack system, the member deflector moves the locking finger 50 away from the path of the cage. As the locking finger 50 is deflected away from the cage, the end block 46 and indicator shield 38 are deflected away as well. As the indicator shield 38 is deflected away from the cage, the indicator block 36 is exposed, thus providing a quick visual indication that the cage is not securely docked within the cage and rack system.

In an embodiment of the invention, lock assembly 30 may have a length L of from about 2 to 3 and preferably 2.5 inches. In an embodiment of the invention, lock assembly 30 may have a width W from about 0.25 to 0.75, preferably 0.5 inches. The relatively small footprint of lock assembly 30 facilitates easy viewing of a cage without the viewing being obscured by the lock assembly. Of course, other dimensions may be used in accordance with the invention as a matter of application specific design choice.

Figure 2:
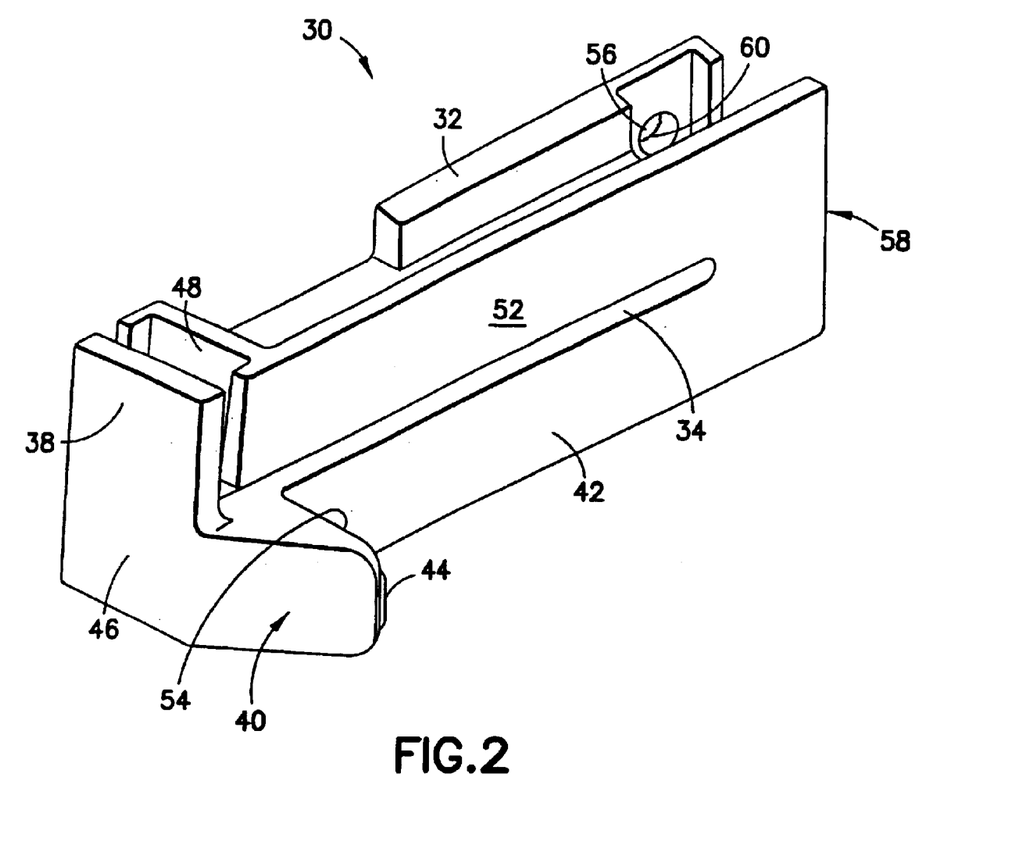
FIG. 2 is a perspective view of a lock assembly of an automatic cage lock constructed in accordance with the present invention.

Referring now to FIG. 2 with continued reference to FIG. 1, the lock assembly 30 is shown as constructed in accordance with an embodiment of the present invention. FIG. 2 illustrates an indicator housing 48 formed at the end of the visual indicator arm 52. The indicator housing 48 is formed to accept the indicator block 36 depicted previously in FIG. 1. The indicator housing 48 allows a variety of color-coded indicator blocks 36 to be inserted therein. The color-coded indicator blocks 36 may be used to indicate a variety of statuses. For example, different colors may be used to indicate different animals or, for example, different groupings of animals with respect to a study or experiment. FIG. 2 further illustrates an end stop 58 formed at the end of the U-shaped configuration of flexing lock member 42 and visual indicator arm 52. Further referring to FIG. 2 with continued reference to FIG. 1 illustrates that the end stop 58 prevents the lock assembly 30 from advancing past a fixed point by end stop 58 coming into contact with the base 16.

Figure 3:
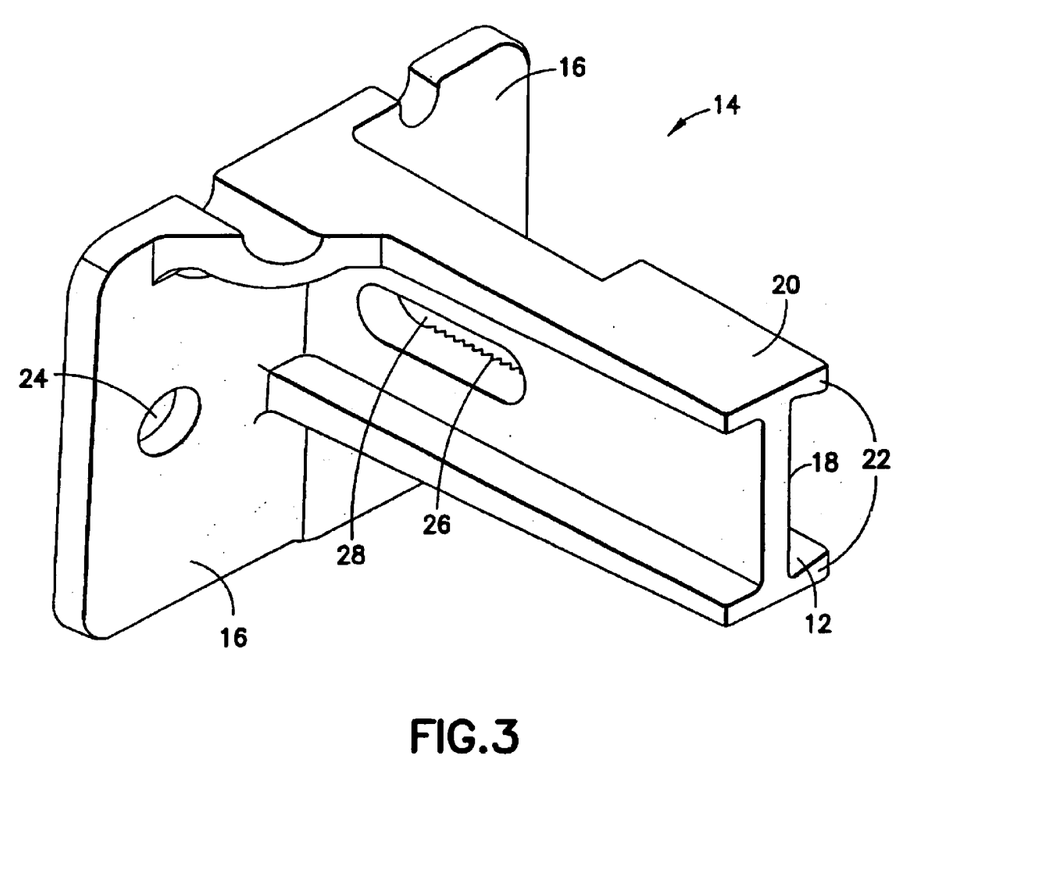
FIG. 3 is a perspective view of a mounting bracket of an automatic cage lock constructed in accordance with the present invention.

Referring now to FIG. 3, the mounting bracket 14 will be discussed in further detail with continued reference to FIG. 1. The mounting bracket 14 is shown having a mounting aperture 24. The mounting aperture 24 may be generally circular and, in an embodiment, the mounting aperture 24 is used to mount the mounting bracket 14 to a fixed surface using a fastening device such as, for example, a screw. The mounting bracket 14 may be comprised of the base 16 and the support arm 20. The support arm 20 may have an adjusting aperture 28 formed therein. The adjusting aperture 28 is generally elongated which allows for a fastening device to be inserted therethrough. Referring again to FIG. 3 with continued reference to FIGS. 1 and 2, the support arm 20 has a plurality of ratchet teeth 26, which are used to matingly engage the engagement teeth 60 contained on lock assembly 30. The ratchet teeth 26 and the engagement teeth 60 prevent the lock assembly 30 from sliding along the docking channel 18 when it is engaged therein, thus maintaining the lock 10 at a specific adjusted position when cages are being pushed into position. The support arm 20 is depicted as having two docking tabs 22 which form a docking channel 18 therebetween. The docking tab 22 has a rail guide 12 which is generally angularly shaped to slidably accept the mounting rail 32 of lock assembly 30. The angular shape of rail guide 12 serves to minimize the occurrence of mounting rail 32 of lock assembly 30 slipping out of, or being disengaged from, the docking channel 18. The angular shape of rail guide 12 serves to minimize the occurrence of the mounting rail 32 slipping out of docking channel 18 while also providing slideable moveability along docking channel 18. This facilitates a longitudinal adjustment of lock assembly 30 to fit customized cages and sizes within the cage and rack system.

Figure 4:
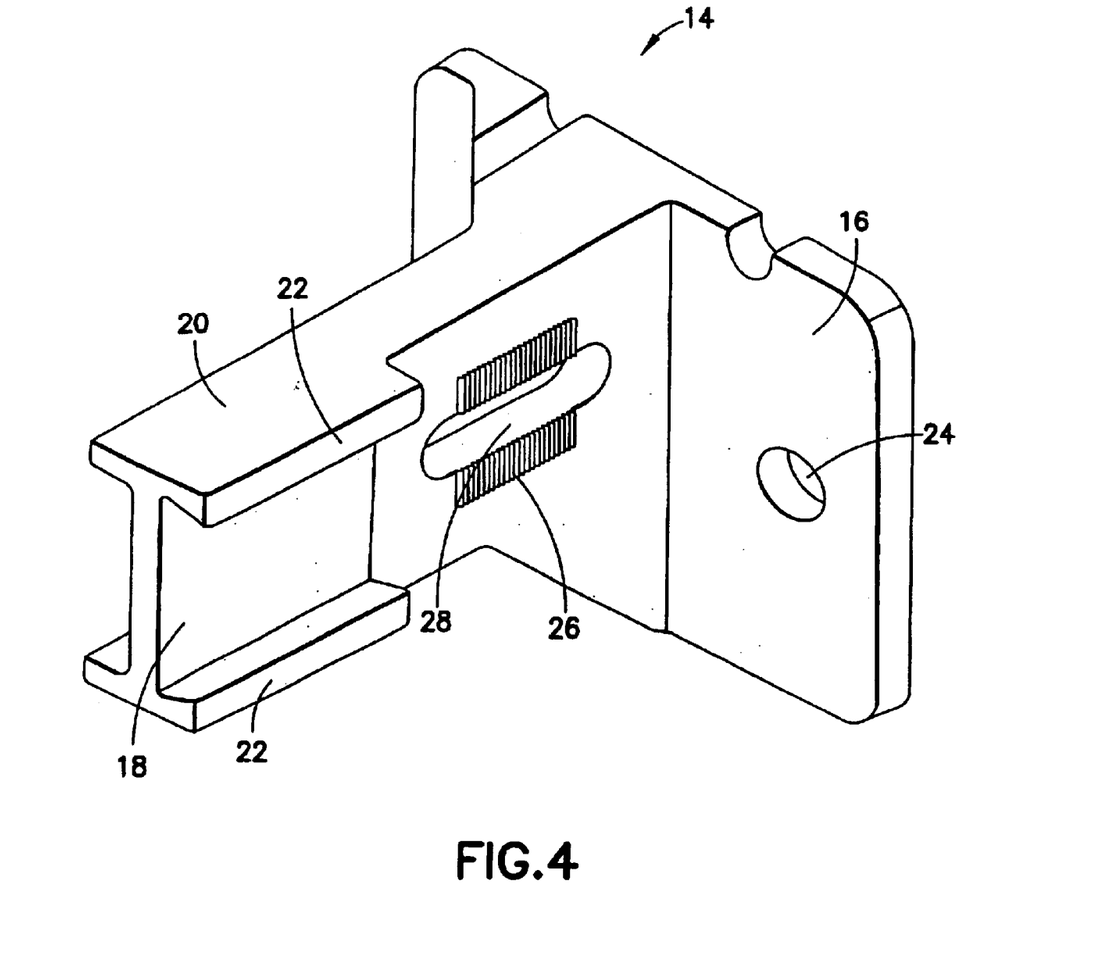
FIG. 4 is a perspective view of a mounting bracket of an automatic cage lock constructed in accordance with the present invention.

Now referring to FIG. 4 with continued reference to FIG. 3, a perspective view of mounting bracket 14 is illustrated depicting a mounting aperture 24. In an embodiment of the invention, a plurality of mounting apertures 24 are employed, thus allowing the mounting bracket 14 to be securely mounted to a surface using a type of fastening device such as a screw(s). In another embodiment, one of the mounting apertures 24 may be replaced with a solid peg. The solid peg is inserted into a pre-drilled hole in the cage and rack system and the second mounting aperture 24 secures mounting bracket 14 to the cage and rack system using a fastening device such as, for example, a screw or a bolt. This embodiment including the peg provides for a fixed and quick mounting of the mounting bracket 14.

Figure 5:
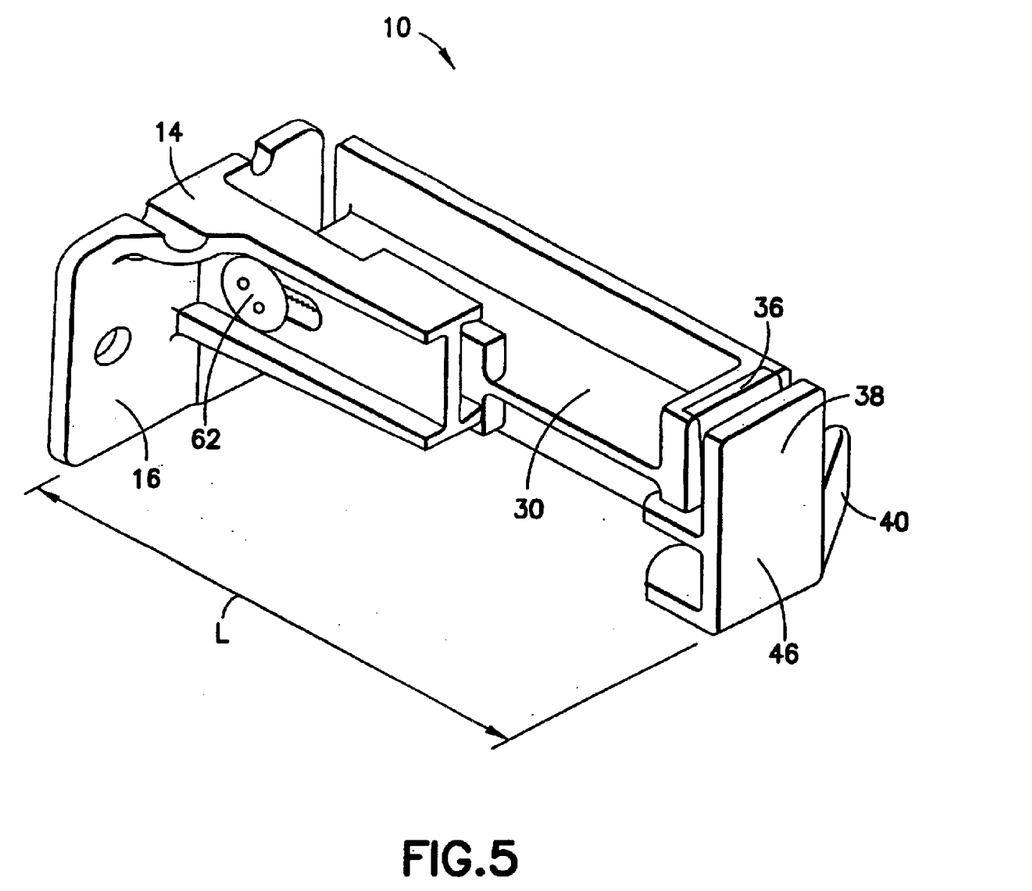
FIG. 5 is a perspective view of an automatic cage lock constructed in accordance with the present invention.

Referring now to FIG. 5 with continued reference to FIG. 1, an automatic cage lock 10 is shown having a fastening member 62 which is inserted in adjusting aperture 28. The fastening member 62 may be used to provide a fixed and secure connection between the mounting bracket 14 and the lock assembly 30. The fastening member 62 may be loosened to slidably adjust the longitudinal size of automatic cage lock 10 to fit custom cage sizes. The fastening member 62 may then be tightened to provide a secure connection by compressing the engagement teeth 26 after the automatic cage lock 10 has been adjusted to the desired longitudinal size.

Figure 6:
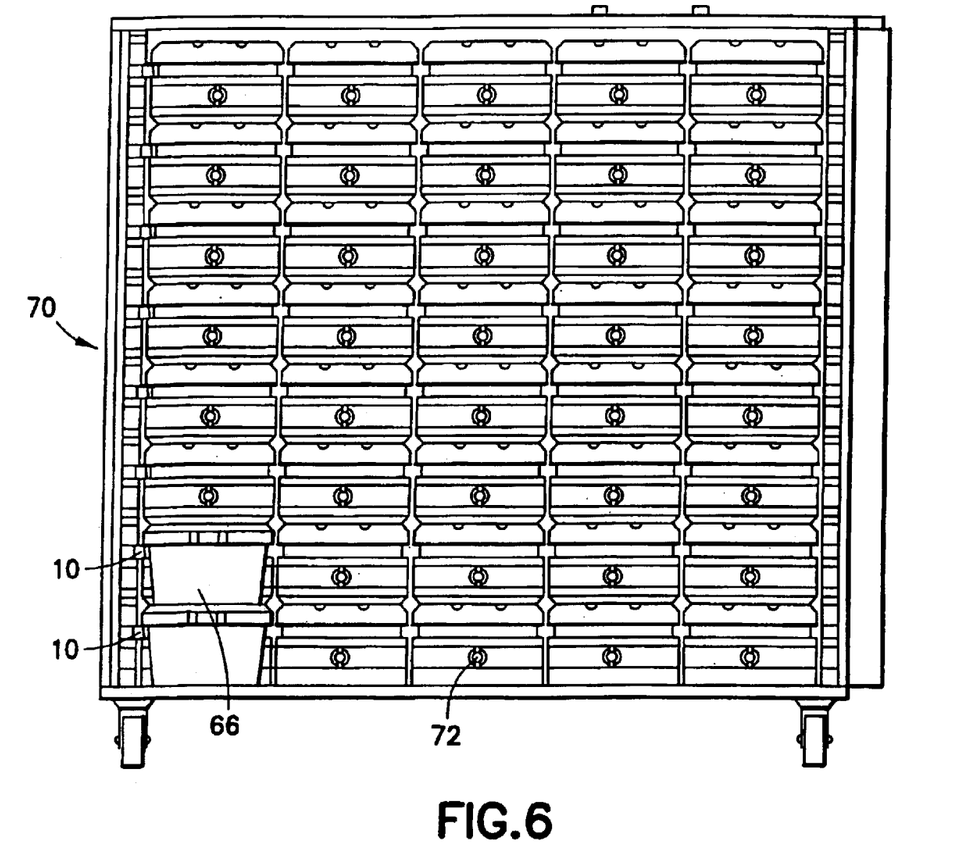
FIG. 6 is a front elevational view of a cage and rack system having an automatic cage lock constructed in accordance with the present invention.

Referring now to FIG. 6, a cage and rack system 70 is depicted having a plurality of cage bins 72 contained therein. The automatic cage lock 10 is shown installed on the cage and rack system 70, and the automatic cage lock 10 is depicted securing a cage 66 within the cage bin 72.

Figure 7:
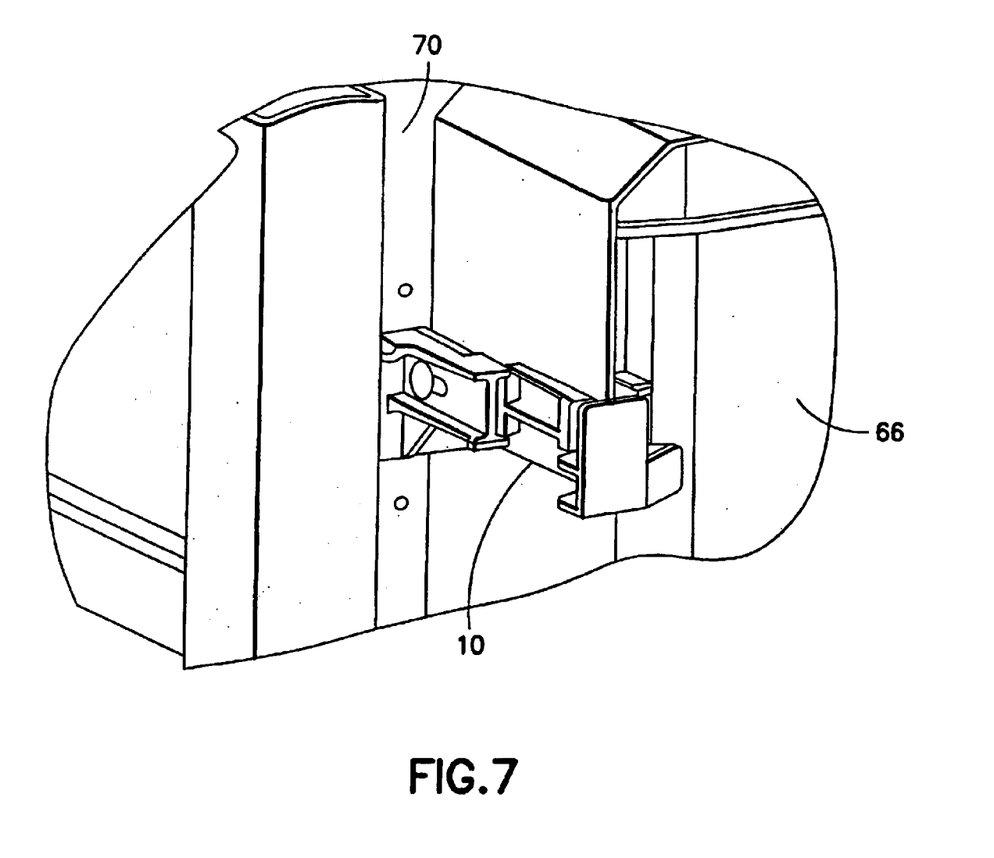
FIG. 7 is a perspective view of a cage and rack system having an automatic cage lock constructed in accordance with the present invention.

In FIG. 7, with continued reference to FIG. 6, the automatic cage lock 10 is fixably mounted to cage and rack system 70 and is further shown securely holding cage 66 in a docked position within the cage and rack system 70.

Figure 8:
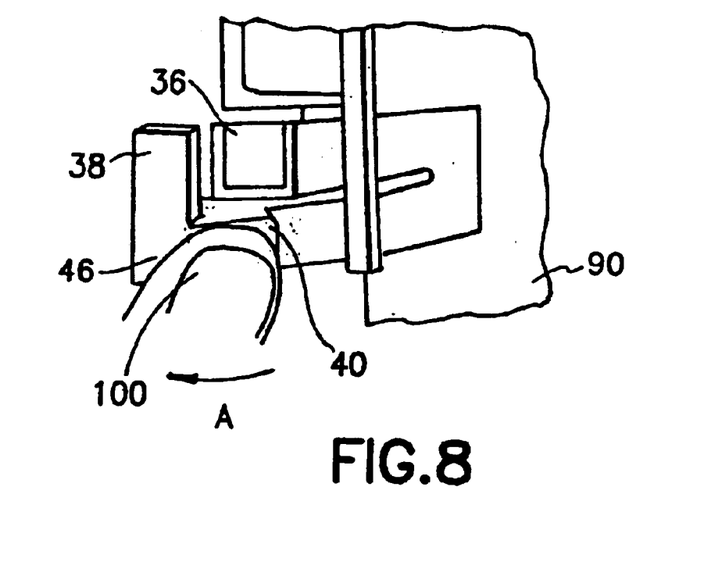
FIG. 8 is a perspective view of a user deflecting a member deflector away from a cage in accordance with the present invention.

With reference to FIG. 8, a user uses his thumb 100 to easily move the member deflector 40 in direction a, thus revealing indicator block 36, and providing clearance for the removal of cage 90. As can be seen from FIG. 8, member deflector 40 would also be deflected in direction A during insertion of cage 90.

Figure 9:
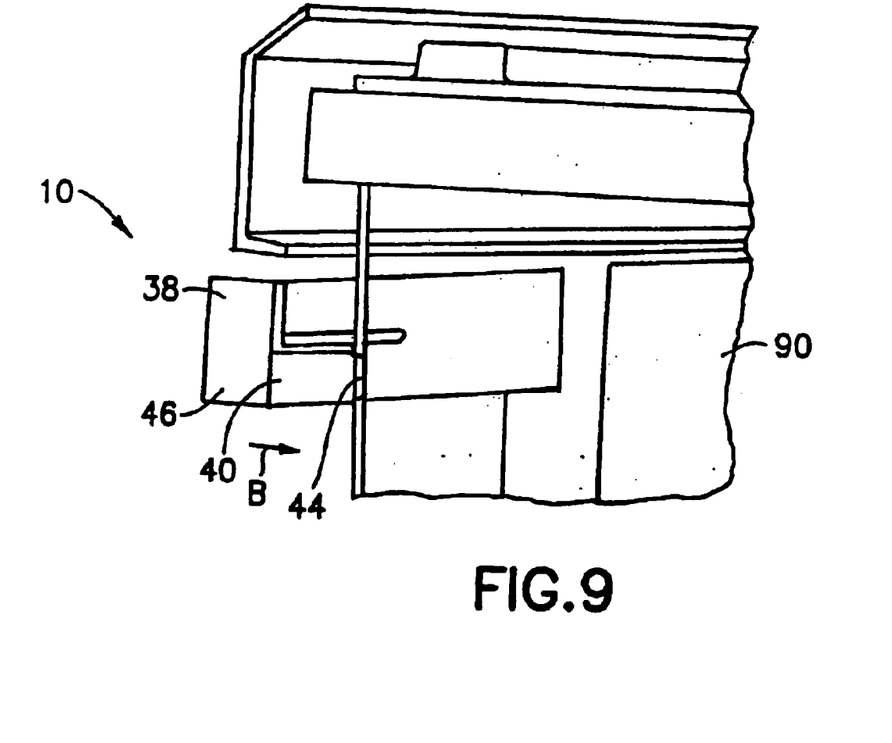
FIG. 9 is a perspective view of a cage lock and cage in accordance with the present invention.

With reference to FIG. 9, there is shown a cage 90 being secured by automatic cage lock 10 as described above.

It will thus be seen that the objects set forth above, and those made apparent from the preceding description, are efficiently attained and, because certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. An automatic cage lock for securing a cage within a cage and rack system, comprising:

a mounting bracket having a base and a support arm, said support arm having a docking channel defined therealong by at least one docking tab;

a rail guide disposed on said docking tab, said rail guide having an angular orientation and forming said docking channel;

a lock assembly slidably disposed within said docking channel for movement along said docking channel whereby adjustment of said lock assembly along said docking channel allows said automatic cage lock to accommodate various cage sizes and lengths a flexing lock member securing the cage in the cage and rack system having a member deflector to automatically deflect said flexing lock member away from the cage during insertion of the case into the cage and rack system; and a locking finger formed at the end of said flexing lock member to lock the cage into the cage and rack system, said locking finger having a locking tab formed thereon to prevent the inadvertent release of the cage; and a locking plate formed on said locking finger and disposed substantially perpendicular to said flexing lock member, said locking plate in communication with the cage to securely maintain the cage within the cage and rack system.

2. The automatic cage lock as recited by claim 1, wherein said support arm is substantially perpendicular to said base.

3. The automatic cage lock as recited by claim 1, wherein said flexing lock member returns to its resting position after the cage is inserted into the cage and rack system which secures the cage.

4. The automatic cage lock as recited by claim 1, further comprising:

at least one mounting aperture in said base to facilitate mounting of said base to a surface;

a plurality of ratchet teeth disposed on said support arm to slidably fix said lock assembly to said support arm; and an adjusting aperture formed in said support arm to accept a fastening member therethrough, said adjusting aperture being substantially elongated thereby allowing longitudinal adjusting of said cage lock.

5. The automatic cage lock as recited by claim 1, further comprising:

at least one mounting rail disposed on said lock assembly to slidably join said lock assembly to said support arm, said mounting rail being oriented transverse to said rail guide;

said lock assembly having a locking aperture formed therein, said locking aperture adjacently mated with said adjusting aperture and secured thereto with said fastening member to maintain the cage lock at an adjusted length; and a plurality of engagement teeth disposed on said lock assembly, said engagement teeth adjacently aligned with said ratchet teeth to prevent undesirable sliding of said lock assembly within said docking channel.

6. The automatic cage lock as recited by claim 1, further comprising:

an end stop disposed at the end of said flexing lock member to limit the distance that said flexing lock member can slide within said docking channel.

7. A The automatic cage lock as recited by claim 1, further comprising:

a visual indicator arm unitarily formed with, and substantially parallel to, said flexing look member, said visual indicator arm and said flexing lock member being partially separated and forming a separation channel therebetween which allows said flexing lock member to move independently from said visual indicator arm; and an indicator housing formed at the end of said visual indicator arm, said indicator housing formed to enclose an indicator block therein, said indicator block being color coded.

8. The automatic cage lock as recited by claim 7, wherein said color-coded indicator block is removable and replaceable.

9. The automatic cage lock as recited by claim 1, further comprising:

an end block unitarily formed at the end of said flexing lock member and adjacent to said locking finger, said end block having an indicator shield to obscure a color-coded indicator block while said locking finger is in a resting position and exposing said color-coded indicator block when said locking finger is deflected by the cage in an unsecured state.

10. An automatic cage lock for securing a cage within a cage and rack system, comprising:

a mounting bracket having a base and a support arm, said support arm having a docking channel defined therealong by at least one docking tab;

a rail guide disposed on said docking tab, said rail guide having an angular orientation and forming said docking channel;

a lock assembly slidably disposed within said docking channel for movement along said docking channel whereby adjustment of said lock assembly along said docking channel allows said automatic cage lock to accommodate various cage sizes and lengths;

a flexing lock member for securing the cage in the cage and rack system having a member deflector to automatically deflect said flexing lock member away from the cage during insertion of the cage into the cage and rack system a locking finger formed at the end of said flexing lock member to lock the cage into the cage and rack system, said locking finger having a locking tab formed thereon to prevent the inadvertent release of the cage; and a locking plate formed on said locking finger and disposed substantially perpendicular to said flexing lock member, said locking plate in communication with the cage to securely maintain the cage within the cage and rack system.

11. The automatic cage lock as recited by claim 10, wherein said support arm is substantially perpendicular to said base.

12. The automatic cage lock as recited by claim 10, wherein said flexing lock member returns to its resting position after the cage is inserted into the cage and rack system which secures the cage.

13. The automatic cage lock as recited by claim 10, further comprising:

at least one mounting aperture in said base to facilitate mounting of said base to a surface;

a plurality of ratchet teeth disposed on said support arm to slidably fix said lock assembly to said support arm; and an adjusting aperture in said support arm to accept a fastening member therethrough, said adjusting aperture being substantially elongated which allows longitudinal adjusting of said cage lock.

14. The automatic cage lock as recited by claim 13, further comprising:

at least one mounting rail disposed on said lock assembly to slidably join said lock assembly to said support arm, said mounting rail oriented transverse to said rail guide;

said lock assembly having a locking aperture formed therein, said locking aperture adjacently mated with said adjusting aperture and secured thereto with said fastening member to maintain the cage lock at a predetermined adjusted length; and a plurality of engagement teeth disposed on said lock assembly, said engagement teeth adjacently aligned with said ratchet teeth to prevent undesirable sliding of said lock assembly within said docking channel.

15. The automatic cage lock as recited by claim 10, further comprising:

an end stop disposed at the end of said flexing lock member to limit the distance that said flexing lock member can slide within said docking channel.

16. The automatic cage lock as recited by claim 10, further comprising:

a visual indicator arm unitarily formed with, and substantially parallel to, said flexing lock member, said visual indicator arm and said flexing lock member being partially separated and forming a separation channel therebetween which allows said flexing lock member to move independently from said visual indicator arm; and an indicator housing formed at the end of said visual indicator arm, said indicator housing formed to enclose an indicator block therein, said indicator block being color coded.

17. The automatic cage lock as recited by claim 16, wherein said color-coded indicator block is removable and replaceable.

18. The automatic cage lock as recited by claim 10, further comprising:

an end block unitarily formed at the end of said flexing lock member and adjacent to said locking finger, said end block having an indicator shield to obscure a color-coded indicator block while said locking finger is in a resting position and exposing said color-coded indicator block when said locking finger is deflected by the cage in an unsecured state.

19. A system for automatically securing a cage into a cage and rack system, comprising:

a cage and rack system having a plurality of cage bins disposed therein;

a cage for housing an animal, said cage being selectively insertable within said cage bin; and an automatic cage lock fixably mounted to said cage and rack system comprising a mounting bracket having a base and a support arm, said support arm having a docking channel defined therethrough by at least one docking tab;

wherein said automatic cage lock having a rail guide disposed on said docking tab, said rail guide having an angular orientation which forms said docking channel;

wherein said automatic cage lock further having a lock assembly slidably disposed within said docking channel for selective movement through and along said docking channel, selective movement of said lock assembly which allows longitudinal adjustment of said cage lock to accommodate various cage sizes and lengths wherein said automatic cage lock has a flexing lock member for securing the cage in the cage and rack system and has a member deflector to automatically deflect said flexing lock member away from the cage during insertion of the cage into the cage and rack system;

wherein said automatic cage lock has a locking finger formed at the end of said flexing lock member to lock the cage into the cage and rack system, said locking finger having a locking tab formed thereon to prevent the inadvertent release of the cage; and a locking plate formed on said locking finger and disposed substantially perpendicular to said flexing lock member, said locking plate in communication with the cage to securely maintain the cage within the cage and rack system.

20. The system for automatically securing a cage into a cage and rack system as recited by clam 19, wherein said support arm is substantially perpendicular to said base.

21. The system for automatically securing a cage into a cage and rack system as recited by claim 19, wherein said flexing lock member returns to its resting position after said cage is inserted into said cage and rack system which secures said cage.

22. The system for automatically securing a cage into a cage and rack system as recited by claim 19, wherein said automatic cage lock has at least one mounting aperture in said base to facilitate mounting of said base to a surface;

a plurality of ratchet teeth disposed on said support arm to slidably fix said lock assembly to said support arm; and an adjusting aperture in said support arm to accept a fastening member therethrough, said adjusting aperture being substantially elongated which allows longitudinal adjusting of said cage lock.

23. The system for automatically securing a cage into a cage and rack system as recited by claim 22, wherein said automatic cage lock has at least one mounting rail disposed on said lock assembly to slidably join said lock assembly to said support arm, said mounting rail oriented transverse to said rail guide;

said lock assembly having a locking aperture formed therein, said locking aperture adjacently mated with said adjusting aperture and secured thereto with said fastening member to maintain the cage lock at a predetermined adjusted length; and a plurality of engagement teeth disposed on said lock assembly, said engagement teeth adjacently aligned with said ratchet teeth to prevent undesirable sliding of said lock assembly within said docking channel.

24. The system for automatically securing a cage into a cage and rack system as recited by claim 19, wherein said automatic cage lock has an end stop disposed at the end of said flexing lock member to limit the distance that said flexing lock member can slide within said docking channel.

25. The system for automatically securing a cage into a cage and rack system as recited by claim 19, wherein said automatic cage lock has a visual indicator arm unitarily formed with, and substantially parallel to, said flexing lock member, said visual indicator arm and said flexing lock member being partially separated and forming a separation channel therebetween which allows said flexing lock member to move independently from said visual indicator arm; and an indicator housing formed at the end of said visual indicator arm, said indicator housing formed to enclose an indicator block therein, said indicator block being color coded.

26. The system for automatically securing a cage into a cage and rack system as recited by claim 25, wherein said color-coded indicator block is removable and replaceable with a variety of colors to indicate various statuses.

27. The system for automatically securing a cage into a cage and rack system as recited by claim 19, wherein said automatic cage lock has an end block unitarily formed at the end of said flexing lock member and adjacent to said locking finger, said end block having an indicator shield to obscure a color-coded indicator block while said locking finger is in a resting position and exposing said color-coded indicator block when said locking finger is deflected by the cage in an unsecured state.

28. An automatic cage lock for securing a cage within a cage and rack system, comprising:

a mounting bracket having a base and a support arm, said support arm having a docking channel defined therethrough by at least one docking tab;

a rail guide disposed on said docking tab, said rail guide having an angular orientation and forming said docking channel;

a lock assembly slidably disposed within said docking channel for movement along said docking channel whereby adjustment of said lock assembly along said docking channel allows said automatic cage lock to accommodate various cage sizes and lengths; and means for securing said support arm to said lock assembly to prevent sliding therebetween;

a flexing lock member for securing the cage in the cage and rack system having a member deflector to automatically deflect said flexing lock member away from the cage during insertion of the cage into the cage and rack system;

a locking finger formed at the end of said flexing lock member to lock the cage into the cage and rack system, said locking finger having a locking tab formed thereon to prevent the inadvertent release of the cage; and a locking plate formed on said locking finger and disposed substantially perpendicular to said flexing lock member, said locking plate in communication with the cage to securely maintain the cage within the cage and rack system.

29. The automatic cage lock as recited by claim 28, wherein said support arm is substantially perpendicular to said base.

30. The automatic cage lock as recited by claim 28, wherein said flexing lock member returns to its resting position after the cage is inserted into the cage and rack system which secures the cage.

31. The automatic cage lock as recited by claim 28, further comprising:

means far mounting said base to a surface; and means for fastening said support arm to said lock assembly to prevent sliding therebetween.

32. The automatic cage lock as recited by claim 28, further comprising:

an end stop disposed at the end of said flexing lock member to limit the distance that said flexing lock member can slide within said docking channel.

33. The automatic cage lock as recited by claim 28, further comprising:

a visual indicator arm unitarily formed with, and substantially parallel to, said flexing lock member, said visual indicator arm and said flexing lock member being partially separated and forming a separation channel therebetween which allows said flexing lock member to move independently from said visual indicator arm; and an indicator housing formed at the end of said visual indicator arm, said indicator housing formed to enclose an indicator block therein, said indicator block being color coded.

34. The automatic cage lock as recited by claim 33, wherein said color-coded indicator block is removable and replaceable.

35. The automatic cage lock as recited by claim 28, further comprising:

an end block unitarily formed at the end of said flexing lock member and adjacent to said locking finger, said end block having an indicator shield to obscure a color-coded indicator block while said locking finger is in a resting position and exposing said color-coded indicator block when said locking finger is deflected by the cage in an unsecured state.

36. An automatic cage lock for securing a cage within a cage and rack system, comprising:

a mounting bracket having a base and a support arm, said support arm having a docking channel defined therealong by at least one docking tab;

a rail guide disposed on said docking tab, said rail guide having an angular orientation and forming said docking channel;

a lock assembly slidably disposed within said docking channel for movement along said docking channel whereby adjustment of said automatic cage lock accommodates various cage sizes and depths;

at least one mounting aperture in said base to facilitate mounting of said base to a surface;

a plurality of ratchet teeth disposed on said support arm to slidably fix said lock assembly to said support arm; and an adjusting aperture formed in said support arm to accept a fastening member therethrough, said adjusting aperture being substantially elongated thereby allowing longitudinal adjusting of said cage look.

37. An automatic cage lock for securing a cage within a cage and rack system, comprising:

a mounting bracket having a base and a support arm, said support arm having a docking channel defined therealong by at least one docking tab;

a rail guide disposed on said docking tab, said rail guide having an angular orientation and forming said docking channel;

a lock assembly slidably disposed within said docking channel for movement along said docking channel whereby adjustment of said automatic cage lock accommodates various cage sizes and depths;

a flexing lock member for securing the cage in the cage and rack system having a member deflector to automatically deflect said flexing lock member away from the cage during insertion of the cage into the cage and rack system;

at least one mounting aperture in said base to facilitate mounting of said base to a surface;

a plurality of ratchet teeth disposed on said support arm to slidably fix said lock assembly to said support arm; and an adjusting aperture in said support arm to accept a fastening member therethrough, said adjusting aperture being substantially elongated which allows longitudinal adjusting of said cage lock.

38. A system for automatically securing a cage into a cage and rack system, comprising:

a cage and rack system having a plurality of cage bins disposed therein;

a cage for housing an animal, said cage being selectively insertable within said cage bin; and an automatic cage lock fixably mounted to said cage and rack system comprising a mounting bracket having a base and a support arm, said support arm having a docking channel defined therethrough by at least one docking tab;

wherein said automatic cage lock having a rail guide disposed on said docking tab, said rail guide having an angular orientation which forms said docking channel;

wherein said automatic cage lock further having a lock assembly slidably disposed within said docking channel for selective movement through and along said docking channel, selective movement of said lock assembly which allows longitudinal adjustment of said cage lock to accommodate various cage sizes and depths;

wherein said automatic cage lock has at least one mounting aperture in said base to facilitate mounting of said base to a surface;

a plurality of ratchet teeth disposed on said support arm to slidably fix said lock assembly to said support arm; and an adjusting aperture in said support arm to accept a fastening member therethrough, said adjusting aperture being substantially elongated which allows longitudinal adjusting of said cage lock.

* * * * *